(12) United States Patent
Obata

(10) Patent No.: US 6,915,557 B2
(45) Date of Patent: Jul. 12, 2005

(54) METHOD OF ASSEMBLING ROTOR STRUCTURE

(75) Inventor: Shigeo Obata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 322 days.

(21) Appl. No.: 10/224,721

(22) Filed: Aug. 21, 2002

(65) Prior Publication Data

US 2003/0037429 A1 Feb. 27, 2003

(30) Foreign Application Priority Data

Aug. 23, 2001 (JP) ........................................ 2001-252330

(51) Int. Cl.[7] .......................... H02K 15/02; H02K 15/10
(52) U.S. Cl. ........................ 29/598; 29/596; 29/603.01; 29/603.03; 156/381; 156/382; 360/99.08; 384/100; 384/107; 438/710; 438/715
(58) Field of Search ...................... 29/598, 596, 603.01, 29/603.03; 156/381, 382; 360/99.08; 384/100, 107; 438/710, 715

(56) References Cited

U.S. PATENT DOCUMENTS

| 5,582,677 A | * | 12/1996 | Miwa et al. | ................. | 156/382 |
| 6,071,014 A | * | 6/2000 | Lee et al. | .................... | 384/107 |
| 6,797,639 B2 | * | 9/2004 | Carducci et al. | ............ | 438/710 |

FOREIGN PATENT DOCUMENTS

JP          59-221845          12/1984

* cited by examiner

Primary Examiner—Carl J. Arbes
Assistant Examiner—Tim Phan
(74) Attorney, Agent, or Firm—RatnerPrestia

(57) ABSTRACT

A method of assembling a rotor structure for a spindle motor for use in an information recording and playback apparatus is provided in which pollution of the recording medium due to gases emitted from adhesives and the like used in the manufacturing process can be prevented. To be more specific, in an assembling process of securing a rotor yoke and a rotating magnet on a disc section, the rotor yoke, the rotating magnet, and the disc section is disposed one after another at predetermined positions of a centering jig used for centering the center of rotation of the rotating magnet and the center of rotation of the disc section. A pressing mechanism is then placed on the disc section to press the disc section, the rotor yoke, and the rotating disc so as to integrate them into one piece. At the same time, emitted gases are exhausted with an exhausting apparatus in a manner such that the direction of flow of the emitted gases is from the main surface of the disc section toward the rotor yoke. With this method, gases and particulates emitted from adhesives are prevented from reaching and adhering on or reacting with the surface of the recording medium, and malfunctioning such as head crash due to degradation and deterioration caused by pollution can be suppressed.

6 Claims, 17 Drawing Sheets

METHOD OF ASSEMBLING ROTOR STRUCTURE

CROSS REFERENCE TO RELATED DOCUMENT

This application claims priority to Japanese Patent Applications No. 2001-252330, filed on Aug. 23, 2001.

FIELD OF THE INVENTION

The present invention relates to a method of assembling a rotor structure on which a disc-shaped recording medium is placed for use in an information recording and playback apparatus for recording information on a magnetic recording medium and playing it back (a rotor structure on which a disc-shaped medium for an information recording and playback apparatus is hereinafter simply referred to as a "rotor structure"), and in particular to a method of assembling in which adverse effect caused by gases emitted from adhesives and the like that are used during assembly operation and adhering on or reacting with the recording surface of the disc-shaped recording medium is prevented.

BACKGROUND OF THE INVENTION

Referring to FIGS. 10A and 10B that illustrate construction of an information recording and playback apparatus using magnetism, a description of the outline of its structure is first given. FIG. 10A is a plan view of an information recording and playback apparatus as viewed from above. FIG. 10B is a cross-sectional view of the information recording and playback apparatus of FIG. 10A cut along the line A-B-C-D. In FIGS. 10A and 10B, in housing 18 of information recording and playback apparatus 1, a spindle motor for rotating information recording medium 2a and magnetic head actuator 17 for driving magnetic head arm 16 to which magnetic head 15 for movably writing and reading out information signal on a recording surface of information recording medium 21 is attached are secured, and cover 19 hermetically seals the inner part of the case of information recording and playback apparatus 1. A rotor structure is constructed in a manner such that a spindle section consisting of spindle 12 and hub 11 and annular information recording medium 21 having a recording layer of a magnetic substance on the surface are bonded together, and the spindle section is rotatably supported by spindle 12 that is securely disposed at the center of a circular recess of base section 3, bearing sleeve 9, and thrust support plate 10. Hub 11 is secured to spindle 12 by press-fitting or with an adhesive, annular information recording medium 21 is placed on a platform extending outwardly of hub 11 and fixed to spindle 12 with disc-shaped pressure plate 13 and set screw 14. Annular rotor yoke 4 and annular rotating magnet 5 magnetized to a plurality of poles are securely disposed along the circumference on the center side of the bottom surface of the platform of hub 11 on which information recording medium 21 is placed. Stator 8 formed of iron core 6 and coil 7 in the inner periphery of a circular recess of base section 3 is securely disposed opposite to rotating magnet 5, thus building a spindle motor for rotating information recording medium 2a that consists of an integral spindle section and a recording section. FIG. 10C is an illustration of another embodiment of an information recording and playback apparatus, where rotor yoke 4 and rotating magnet 5 are securely disposed along the circumference of the outer periphery of the bottom surface of the platform of hub 11 on which information recording medium 2a is placed. This structure is the same as that of FIG. 10B with the exception that stator 8 composed of iron core 6 and coil 7 is securely disposed on bearing sleeve 9 that is fixed to the center of base section 3 opposite to rotating magnet 5. A spindle motor having the structure as shown in FIG. 10B is generally called an inner-rotor type rotor, whereas a spindle motor having the structure as shown in FIG. 10C is called an outer-rotor type rotor. There are many examples of achieving a thinner design of a spindle motor by providing a hub for securing an annular substrate, namely, information recording medium, on the spindle section of a spindle motor of an information recording and playback apparatus, and providing a rotor magnet and a stator on the periphery of the hub as has been described above.

Also, technologies have heretofore been proposed for preventing malfunctioning of an information recording and playback apparatus due to adherence onto the surface of the recording medium of various gases or particulates emitted by structural materials of an information recording and playback apparatus, and for preventing performance reduction of the recording medium due to chemical reaction of the above-mentioned various gases or particulates with the recording medium (for example, Japanese Patent Application, Publication No. JP59-221845).

However, the heretofore proposed technologies to combat malfunctioning of a conventional information recording and playback apparatus due to adherence on the surface of the recording medium of various gases and particulates emitted by structural materials of the information recording and playback apparatus, or reduction in performance of the recording medium due to chemical reaction of the above-mentioned various gases or particulates relate to methods for absorbing/adsorbing with a filter provided inside the apparatus or inside the cabinet that houses the apparatus, or discharging to outside with a fan or a pump various gases and particulates emitted by the structural materials when the information recording and playback apparatus is in operation after shipment. These proposed technologies also relate to devices or methods for discharging or exhausting in advance various gases or particulates from the recording medium when manufacturing the recording medium itself. Accordingly, they are not effective in suppressing effects caused on the recording medium by gases or particulates emitted by various components and materials during heating and other operations in the manufacture of structural materials of an information recording and playback apparatus. As a result, when gases emitted from an adhesive material during assembling work in the manufacture of an apparatus reach the surface of the recording medium, pollution and degradation of the information recording layer may be caused thus leaving a problem of possible malfunctioning such as head crash unsolved.

What is more, while extra magnetic flux from a rotating magnet converges in the iron core facing to stator and will not hardly leak out when fully assembled as a drive unit for a recording and playback apparatus, during the rotor assembling process, as there is no iron core, an appreciably high level of magnetic flux leakage that might affect information recording layer of the recording medium occurs. At the same time, there has also been a problem that, when a thermosetting adhesive (including an adhesive that requires both ultraviolet ray and heat) is employed in assembling, the magnetic layer is slightly magnetized due to the influence of both leakage flux from a rotating magnet and heat applied in the manufacturing process, thus disturbing a servo signal prerecorded by magnetic transfer and other method on the recording medium and disabling normal recording and playback operation.

SUMMARY OF THE INVENTION

The present invention addresses the above-described problems. It is an object of the present invention to provide a method for assembling a rotor structure on which a disc-shaped recording medium for an information recording and playback apparatus for magnetically recording and playing back information is placed, and according to which method, gases and particulates emitted from adhesives and the like during assembling operation of components and materials in the manufacturing process are prevented from reaching and adhering or reacting with the surface of the recording medium, and, at the same time, superposition of magnetic noises on the disc-shaped recording medium due to magnetic leakage from magnetic materials such as magnet of a motor used in the drive unit is controlled.

In order to achieve the object, the method of assembling a rotor structure of the present invention has the following configurations.

In one configuration of the method of assembling a rotor structure in accordance with the present invention, the assembling process of a rotor structure fabricated by bonding at least a disc section having an information recording layer on its main surface and a circular cylinder projecting out on a surface opposite to the main surface comprises the steps of:

(a) disposing a projecting member and a disc section at predetermined positions on an assembling/centering jig to be used for centering at least the center of rotation of the projecting member and the center of rotation of the disc section;

(b) disposing a pressing mechanism on the disc section and integrating the disc section and the projecting member by pressing the disc section and the projecting member; and (c) isolating and exhausting gases emitted from the information recording layer by using an exhausting apparatus, where the direction of flow of the exhaust gases is set to be from the main surface of the disc section toward the projecting member.

Also, in a configuration of a method of assembling a rotor structure in accordance with the present invention, the assembling process of a rotor structure that comprises at least a yoke section made of a soft magnetic material and a disc section having an information recording layer on its main surface comprises the steps of:

(a) disposing a yoke section and a disc section at predetermined positions on an assembling/centering jig to be used for centering at least the center of rotation of the yoke section and the center of rotation of the disc section;

(b) disposing a pressing mechanism on the disc section and integrating the disc section and the yoke section by pressing the disc section and the yoke section; and (c) isolating and exhausting gases emitted from the information recording layer by using an exhausting apparatus, where the direction of flow of the exhaust gases is set to be from the main surface of the disc section toward the yoke section.

In another configuration of the method of assembling a rotor structure in accordance with the present invention, the assembling process of a rotor structure that comprises at least a yoke section made of a soft magnetic material, a rotating magnet magnetized to a plurality of poles, and a disc section having an information recording layer on its main surface, the assembling process comprises the steps of:

(a) disposing a yoke section, a disc section, and a rotating magnet at predetermined positions on a centering jig to be used for centering at least the center of rotation of the rotating magnet and the center of rotation of the disc section;

(b) disposing a pressing mechanism on the disc section and integrating the disc section, the yoke section, and the rotating magnet by pressing the disc section, the yoke section, and the rotating magnet; and (c) isolating and exhausting gases emitted from the information recording layer by using an exhausting apparatus, where the direction of flow of the exhaust gases is set to be from the main surface of the disc section toward the yoke section.

Also, in yet another configuration of the method of assembling a rotor structure in accordance with the present invention, the assembling process of a rotor structure that comprises at least a yoke section made of a soft magnetic material, a rotating magnet magnetized to a plurality of poles, and a disc section having an information recording layer on its main surface, the assembling comprises the steps of:

(a) disposing a rotating magnet and a disc section on which a yoke section is formed at predetermined positions on a centering jig to be used for centering at least the center of rotation of the rotating magnet and the center of rotation of the disc section;

(b) disposing a pressing mechanism on the disc section and integrating the disc section on which the yoke section is formed and the rotating magnet by pressing the disc section and the rotating magnet; and (c) isolating and exhausting gases emitted from the information recording layer by using an exhausting apparatus, where the direction of flow of the exhaust gases is set to be from the main surface of the disc section toward the yoke section.

Furthermore, these methods of assembling a rotor structure of the present invention carry out the step of integration while heating and include a configuration for using a centering jig made of a soft magnetic material or a configuration in which the pressing mechanism makes use of suction of an exhausting apparatus and presses the disc section from above the disc section with atmospheric pressure thus achieving integration.

With these configurations, as exhaustion is carried out when mounting a disc on an assembling/centering or centering jig, it becomes possible to absorb emitted gases in advance and pollution of the recording surface can be prevented by not allowing the emitted gases to reach the surface of the information recording layer. Also, in another configuration, as atmospheric pressure is applied to the information recording layer of the recording medium, it becomes unnecessary to press down the surface of the recording layer of the medium by direct contact, and pollution can be suppressed. In still another configuration, as the leakage magnetic flux is converged by a centering jig made of a soft magnetic material, in the event the coercivity of the magnetic layer of the recording medium is lowered due to heating, leakage flux is prevented from reaching the magnetic layer for recording information and affecting as noise magnetic field. With these measures, malfunctioning such as head crash caused by pollution or degradation owing to adherence of emitted gases on the information recording layer can be suppressed, and distortion of a recorded and reproduced signal due to magnetic noises when incorporated in a drive apparatus can be suppressed.

DETAILED DESCRIPTION OF THE INVENTION

A detailed description of exemplary embodiments of the present invention will be given below in reference to drawings.

First Exemplary Embodiment

Figure 1:
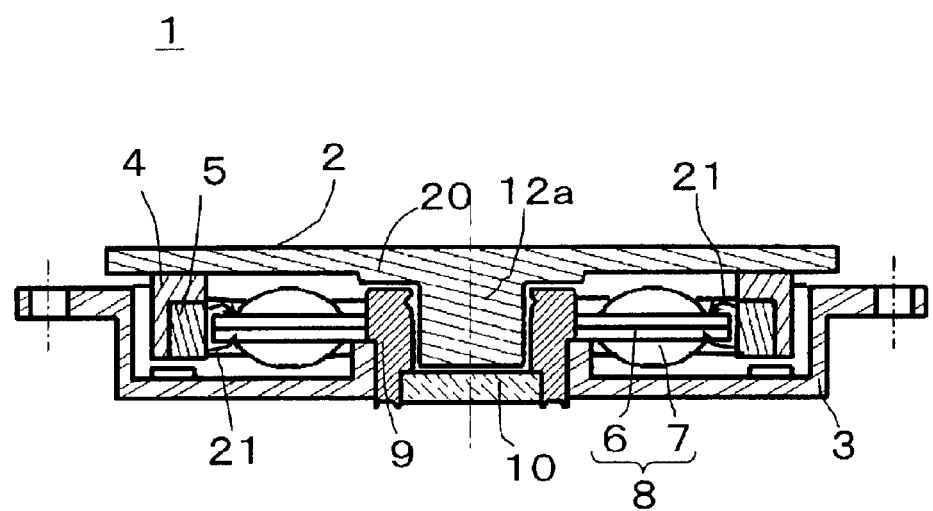
FIG. 1 is a diagram showing an example of construction of a spindle motor for use in an information recording and playback apparatus of the present invention.
Figure 10A:
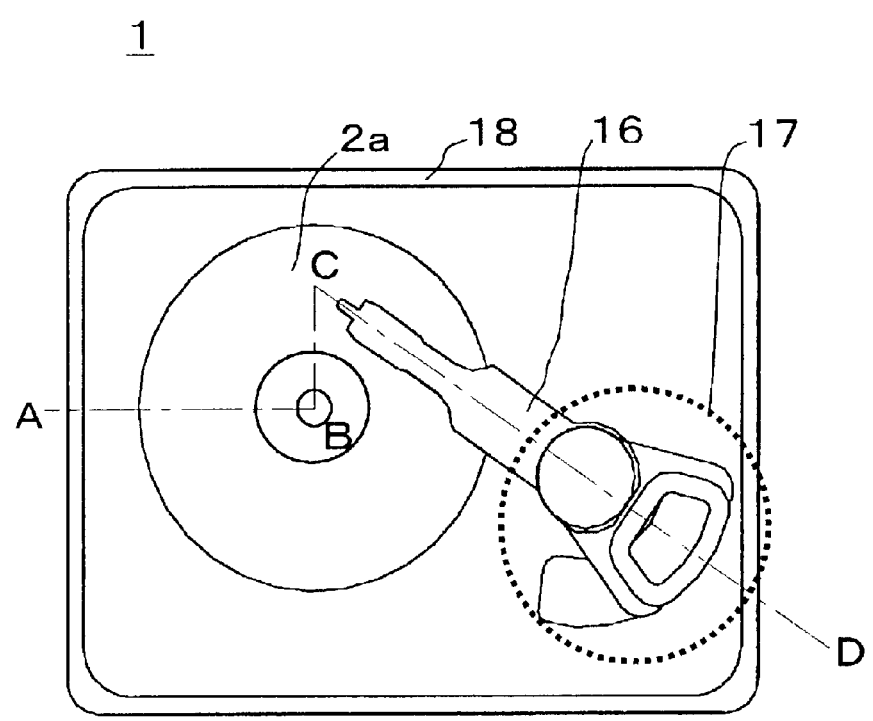
FIG. 10A is a plan view to illustrate structure of a conventional information recording and playback apparatus and a construction example of a spindle motor employed therein.
Figure 10B:
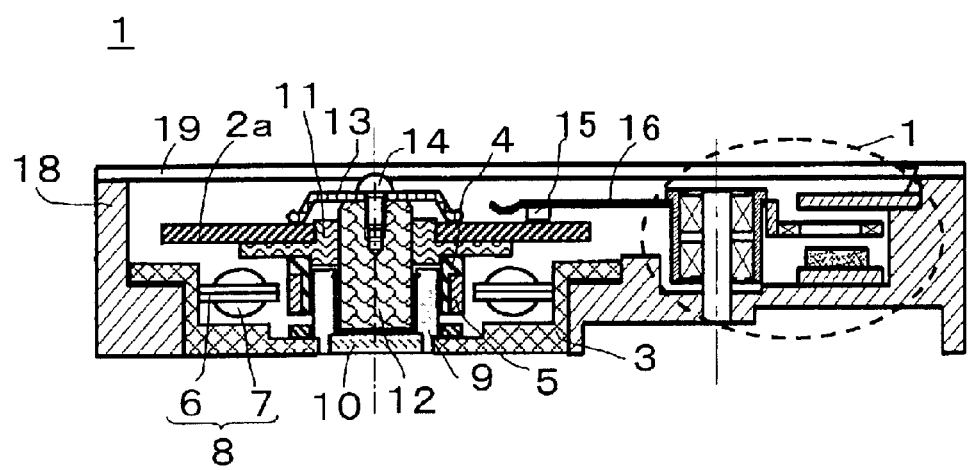
FIG. 10B is a cross-sectional view to illustrate structure of a conventional information recording and playback apparatus and a construction example of a spindle motor employed therein.
Figure 10C:
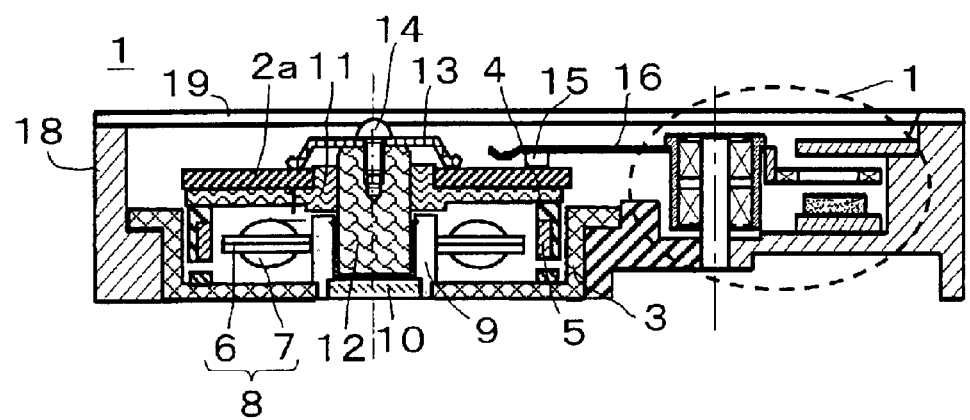
FIG. 10C is a cross-sectional view to illustrate structure of a conventional information recording and playback apparatus and another construction example of a spindle motor employed therein.

FIG. 1 illustrates structure of a spindle motor to be used in assembling a rotor structure on which a disc-shaped medium for an information recording and playback apparatus in accordance with the present invention is placed. While an entire information recording and playback apparatus is shown in FIGS. 10A to 10C in the description of a prior art, only the spindle motor section is shown in FIG. 1 excluding housing 18, cover 19, magnetic head 15, magnetic head arm 16, and magnetic-head actuator section 17. Disc section 20 of the spindle motor in FIG. 1 is constructed in a manner such that disc-shaped recording medium section 2 and cylindrical or tubular spindle section 12a are integrated into one piece and the configuration of the cross section of disc section 20 as cut along an arbitrary diameter is roughly T-shaped. With this disc section 20 having a T-shaped cross section, a hub section for securing a substrate for making an information recording medium or a substrate-securing section is not required and a substrate section having an information recording layer can be directly attached on the spindle thereby enabling integration of the recording medium and the spindle motor and making the thickness thinner. As a result, a thin and compact configuration of the entire information recording and playback apparatus is enabled. As many parts of these configurations are similar to the configuration of the spindle motor section of the information recording and playback apparatus as illustrated in FIGS. 10A to 10C in the description of the prior art, duplicate description will be omitted in the following.

Figure 2:
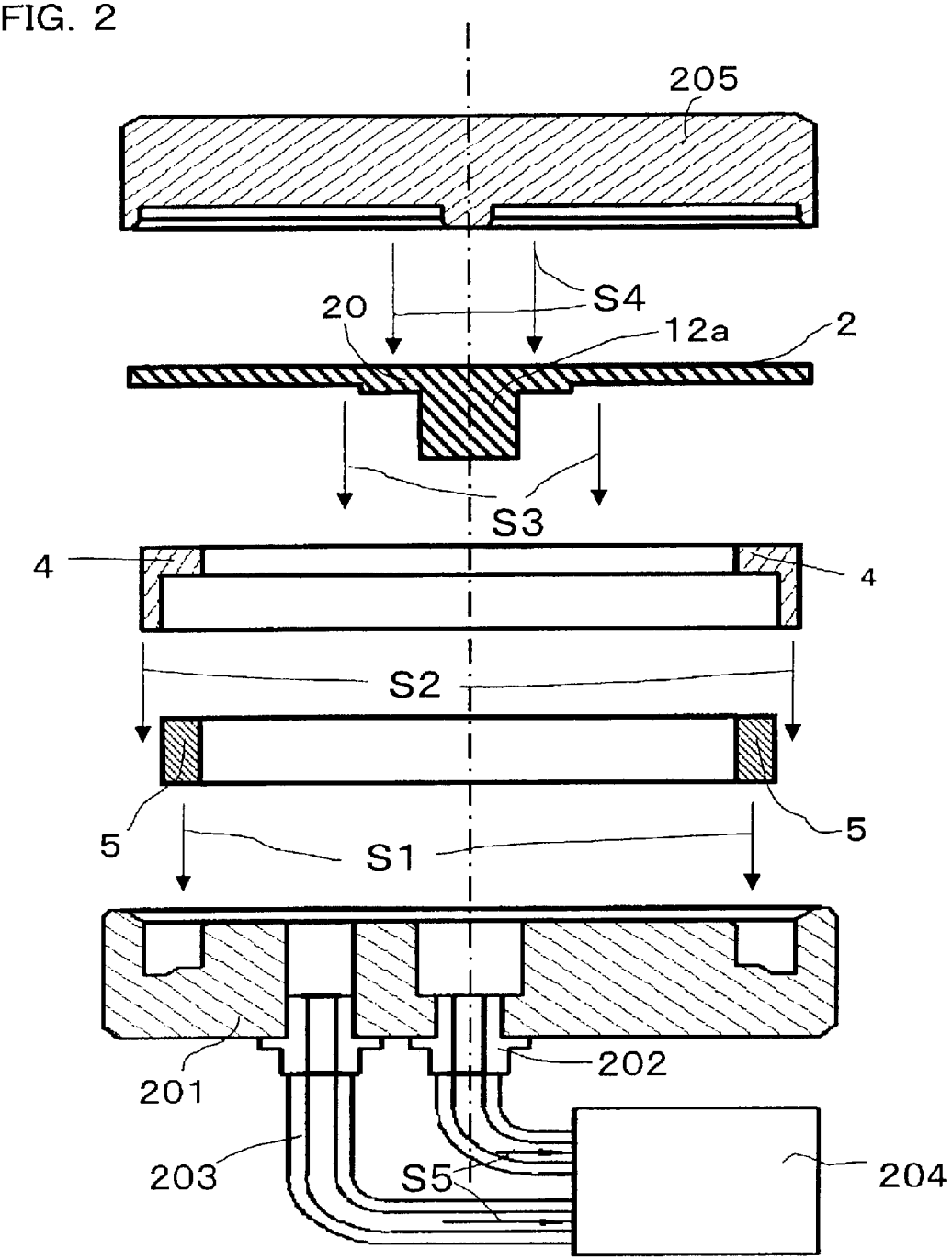
FIG. 2 is a diagram to illustrate the steps of assembling a rotor structure in a first exemplary embodiment of the present invention.

Next, a description will be given on the method of assembling a rotor structure in the first exemplary embodiment of the present invention. FIG. 2 is a schematic representation of the steps of assembling by bonding yoke section 4 (rotor yoke) made of a soft magnetic material and rotating magnet 5 magnetized to a plurality of poles to disc section 20 that has a T-shaped cross section with spindle section 12a and a disc-shaped substrate section being integrated into one piece. The first step is preparation of centering jig 201 made of a soft magnetic material. Centering jig 201 is so structured that it is provided with an exhaust inlet disposed on a surface opposite to a bottom surface of disc section 20, an exhaust outlet disposed on a surface having no exhaust inlet, and a hole communicating from the exhaust inlet to the exhaust outlet, and that emitted gases are exhausted by exhaust apparatus 204 via exhaust pipe 203 connected to exhaust pipe joint 202 provided at the exhaust outlet.

In the steps of FIG. 2, a thermosetting adhesive or an adhesive curing of which can be promoted by concurrent application of heat is coated on a predetermined bonding surface of rotating magnet 5, rotating magnet 5 is at a predetermined position on centering jig 201 made of a soft magnetic material (Step S1). Subsequently, rotor yoke 4 made of a soft magnetic material is coated with a thermosetting adhesive on its predetermined bonding surface and disposed at a predetermined position on centering jig 201 (Step S2), and disc section 20 having a T-shaped cross section and having spindle section 12a and disc-shaped recording medium section 2 integrated into one piece is placed at a predetermined position on centering jig 201 (Step 3). Next, as each component has been mounted on centering jig 201 made of a soft magnetic material and is ready for completion of assembling operation, a weight made of a non-magnetic material is placed as pressing mechanism 205 on disc section 20 (Step 4). It is preferable that the non-magnetic weight as pressing mechanism 205 imposes the load to either the central portion or outermost periphery of the main surface of disc section 20 through direct contact. Pressing mechanism 205 is not limited to an example of a weight as shown diagrammatically. While it can be a pressing mechanism like a clamp, it is preferable to configure with a non-magnetic material. Here, the pressing force may be fixed throughout curing process of adhesives, or the force may be kept high before curing or immediately after curing and loosened or removed later on. Lastly, emitted gases are exhausted by connecting exhausting apparatus 204 to exhaust pipe joint 202 provided at the exhaust outlet of centering jig 201 made of a soft magnetic material via exhaust pipe 203 (Step 5). The sequence of Step S1 and Step S2 may be reversed or Step 1 and Step 2 may be carried out concurrently.

In the method of assembling a rotor structure in the first exemplary embodiment of the present invention, the description until here has been made on a configuration in which the disc section used in the spindle motor has a T-shaped cross section. However, with the present invention, the construction and shape of the disc section is not limited to this configuration. In addition to this embodiment, the construction of the disc section may be such that a spindle section and a hub each made of a soft magnetic material are formed as an integral unit and a disc-shaped information recording medium is placed and bonded on the upper surface of the hub. The disc section may also be made by press-fitting or bonding with an adhesive and the like an annular information recording medium on a projecting platform on the outer periphery of a hub made of a soft magnetic material and press-fit in the spindle section. However, in the latter two cases, rotor yoke 4 must have been formed integrally with the hub made of a soft magnetic material. In this case, while Step 3 of FIG. 2 is not required, assembling work is carried out through the same steps as above-described in reference to FIG. 2.

Figure 3:
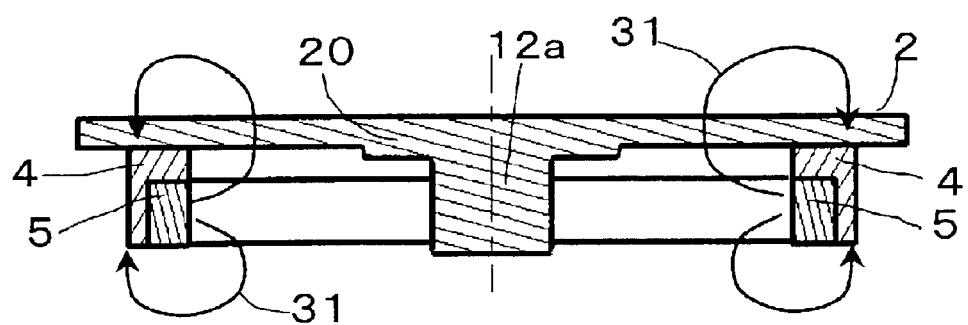
FIG. 3 is a cross-sectional view of an example of construction of a rotor structure of a spindle motor for use in an information recording and playback apparatus of the present invention.

As centering jig 201 made of a soft magnetic material also serves as an exhausting jig for exhausting emitted gases, a description of the reason for using a soft magnetic material will now be given. In FIG. 1, as leakage flux 21 from rotating magnet 5 converges in iron core 6 as shown by curves having an arrow head, it does not reach the recording layer of disc section 20 formed with a magnetic material. Also, even when heat is applied from outside to a completed spindle motor, no magnetic noise due to leakage flux 21 is caused thus giving no adverse effect on the recording and playback of a signal. On the other hand, a rotor structure shown in FIG. 3 represents a state before being assembled into a spindle motor illustrated in FIG. 1, where rotor yoke 4 made of a soft magnetic material and rotating magnet 5 magnetized to a plurality of poles are bonded together on disc section 20 having a T-shaped cross section as a result of integrating spindle section 12a and disc-shaped recording medium section 2. In this state, leakage flux 31 from rotating magnet 5 reaches the information recording layer (magnetic layer) made of a magnetic substance of disc section 20 as shown by curves having an arrow head, as in FIG. 1, since there is no magnetic substance other than rotor yoke 4. When heat is applied in this state, as the coercivity of the magnetic layer is lowered due to heating, magnetic noises affect the magnetic layer. In practice, when bonding rotor yoke 4 made of a soft magnetic material and rotating magnet 5 to disc section 20, a thermosetting resin is used in many cases. Accordingly, the magnetic layer is slightly magnetized due to the combined effect of leakage flux from the rotating magnet and from the heat applied in the bonding process, and magnetic noises are superimposedly recorded on the magnetic layer. Especially when recording servo signals on the recording medium in advance by magnetic transfer, the servo signals are disturbed thus disabling normal recording and playback operation. For this reason, leakage flux is made to converge in the centering jig made of a soft magnetic material in order to prevent influence on the information recording layer of disc section 20. Here, depending on the configuration of rotor yoke 4, it is possible to make the leakage of magnetic flux from rotating magnet 5 to the information recording layer of disc section 20 at a negligible level. In such a case, centering jig 20 may be made of a non-magnetic material.

Figure 4A:
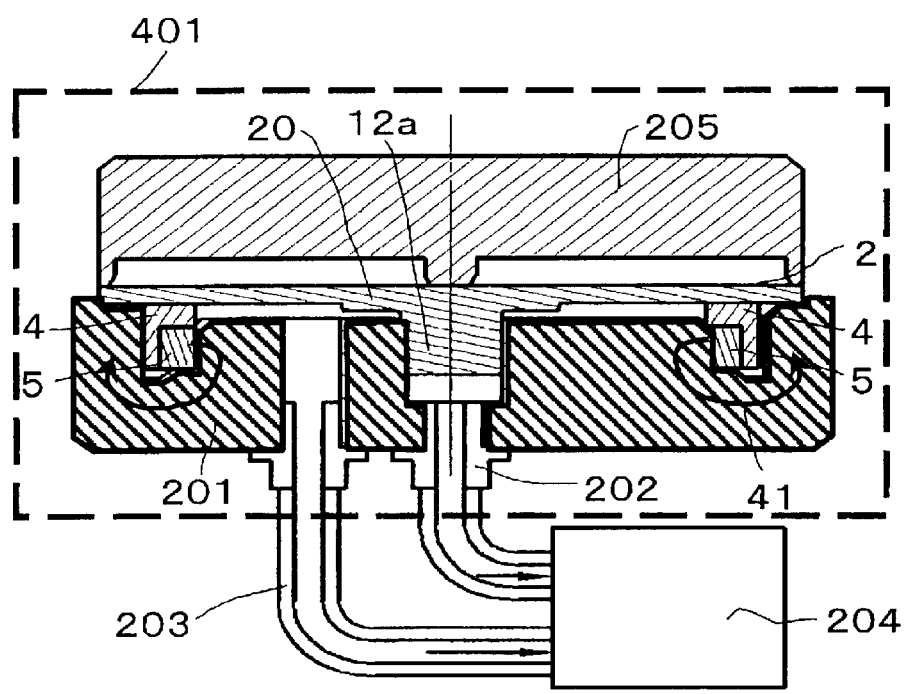
FIG. 4A is a diagram to illustrate the method of assembling a rotor structure in the first exemplary embodiment of the present invention.
Figure 4B:
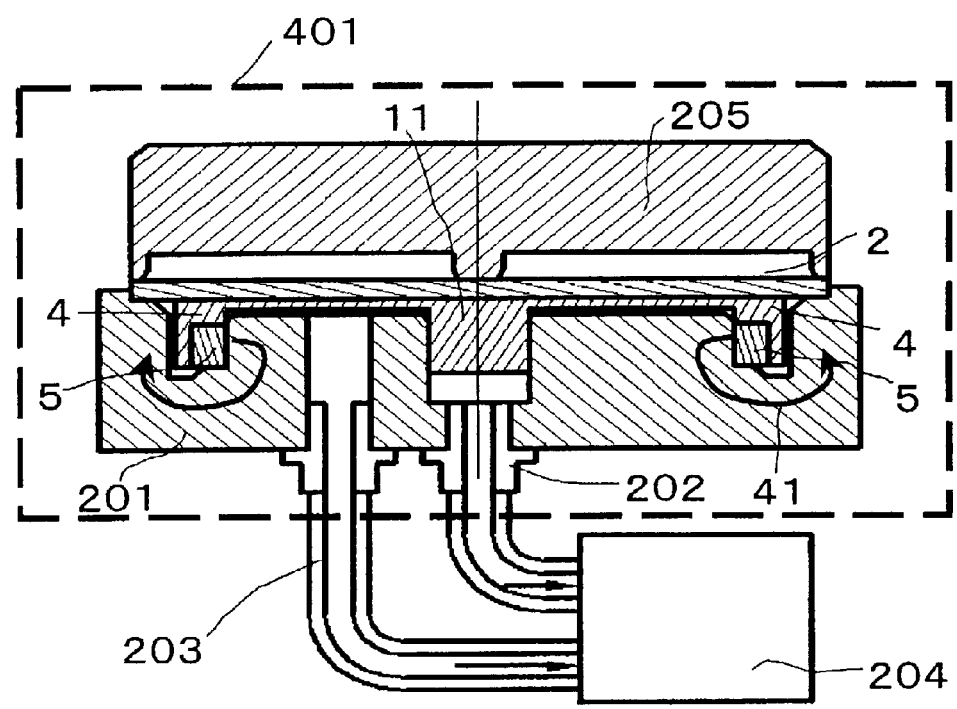
FIG. 4B is a diagram to illustrate the method of assembling another configuration of a rotor structure in the first exemplary embodiment of the present invention.

FIG. 4A is an illustration of the steps of placing assembled components in furnace 401, curing the adhesive by heating, securing rotor yoke 4 made of a soft magnetic material and rotating magnet 5 magnetized to a plurality of poles to disc section 20 having a T-shaped cross section, and, at the same time, exhausting gases emitted from the adhesive by isolating them from reaching the information recording layer. FIG. 4B is an illustration of an example of the steps of assembling each component by using disc section 20 that has a construction of being made by integrating a spindle, a hub, and rotor yoke 4, each made of a soft magnetic material, into one piece, and securing a disc-shaped medium on the upper surface of the hub, placing in furnace 401 after assembling each component, curing the coated adhesive by heating, securing rotating magnet 5 that is magnetized to a plurality of poles on rotor yoke 4 made of a soft magnetic material integrally formed with disc section 20, and, at the same time, exhausting gases emitted from the adhesive by isolating them from reaching the information recording layer.

Centering jig 201 made of a soft magnetic material and illustrated in FIGS. 4A and 4B has a role of emitted gas exhausting jig as was described earlier. An exhaust inlet is provided on a surface opposite to a bottom surface of a rotating disc, a hole communicating with en exhaust outlet is provided on a surface that does not have the exhaust inlet, exhausting apparatus 204, such as an exhaust pump, is connected to exhaust pipe joint 202 provided at the opening of the exhaust outlet via exhaust pipe 203, and gases and particulates emitted from the adhesives are exhausted. As a result, even when gases are emitted when bonding, the emitted gases are isolated from and will not reach the information recording layer of disc section 20 as they are exhausted by exhausting apparatus 204, such as a pump.

Also, as a soft magnetic material is employed in centering jig 201, leakage flux 41 converges in centering jig 201 made of a soft magnetic material without reaching the information recording layer of disc section 20 formed with a magnetic material as is the case shown in FIG. 3 in which leakage flux 31 from rotating magnet 5 reaches the information recording layer (magnetic layer). When centering jig 201 is made of a non-magnetic material, magnetic flux does not converge in centering jig 201 but reaches the magnetic layer of disc section 20 thus not showing any convergence effect. Here, not any magnetic material is good as the material for centering jig 201. A soft magnetic material is preferable, and, more preferably, a soft magnetic material having a high permeability.

As was mentioned earlier, while the pressing force may be fixed throughout the adhesive curing process, it may of a high value before curing or immediately after start of curing and relieved or removed later on. By doing like this, as the components to be bonded are pushed together with a high pressure in the initial stage, an adhesive between the components is uniformly and thinly spread, and the adhesion can be made uniform over the entire surface of bonding. The adhesive will remain between the components when the pressing force is removed or relieved later on. Here, when a high pressure is kept applied at an overheated condition, there is a possibility of causing excessive residual stress in disc section 20 and other components during cooling after bonding process is finished. Also, as disc section 20 requires a high degree of flatness, when a high pressure is kept applied with a poor degree of flatness of rotor yoke 4 that is to be bonded to disc section 20, disc section 20 is deformed in the shape of rotor yoke 4. By relieving or removing the pressure at this point, flatness of disc section 20 will not be directly deteriorated even when the flatness of the surface opposite to disc section 20 is poor thus enabling disc section 20 to maintain a high degree of flatness even after bonding.

Figure 5A:
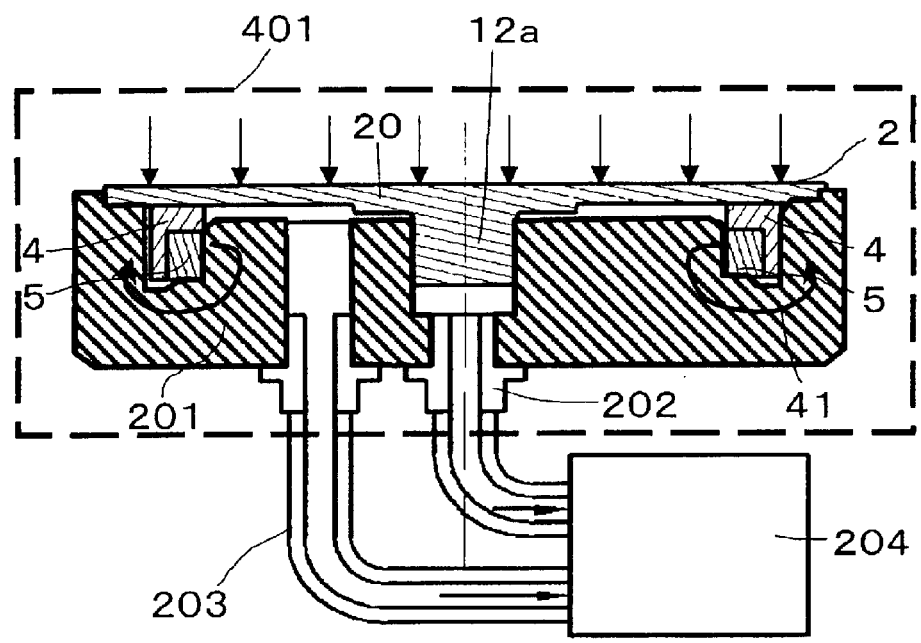
FIG. 5A is a diagram to illustrate another method of assembling a rotor structure in the first exemplary embodiment of the present invention.
Figure 5B:
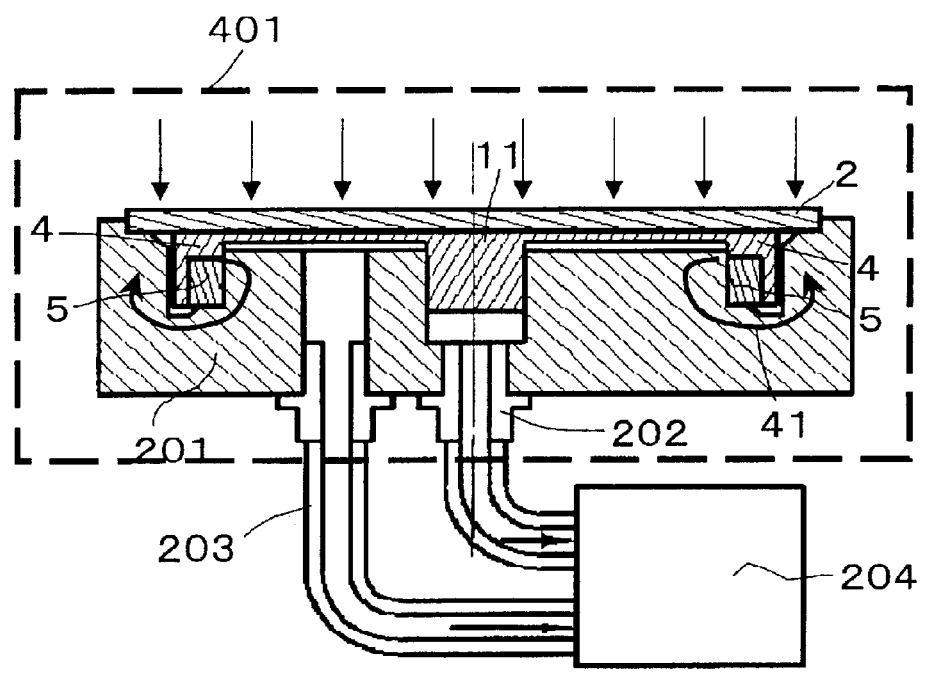
FIG. 5B is a diagram to illustrate still another method of assembling another configuration of a rotor structure in the first exemplary embodiment of the present invention.

FIG. 5A and FIG. 5B illustrate another configurations of the method of assembling a rotor structure in the first exemplary embodiment of the present invention. By increasing the suction of exhausting apparatus 204, such as a pump, for exhausting emitted gases, atmospheric pressure can be applied to the surface of disc section 20 as shown by downward arrows in FIGS. 5A and 5B without using pressing mechanism 205 for bonding such as a weight thus causing disc section 20 to be sucked downward to centering jig 201 thereby being pressed. In this case, as it is not necessary to press by directly placing pressing mechanism 205 for bonding such as a weight, it is possible to prevent pollution of the disc surface due to contacting. Furthermore, there is an advantage of being able to remove with ease a finished product from the jig by sending some air back through exhaust pipe 203 after completion of the assembling work.

Here, while the pressing force may be fixed throughout the adhesives curing process, it may of a high value before curing or immediately after start of curing and relieved or removed later on. By doing like this, as the components to be bonded are pushed together with a high pressure in the initial stage, the adhesive between the components is uniformly and thinly spread, and the adhesion can be made uniform over the entire surface of bonding. The adhesive will remain between the components when the pressing force is removed or relieved later on. Here, when a high pressure is kept applied at an overheated condition, there is a possibility of causing an excessive residual stress in disc section 20 and other components during cooling after bonding process is finished. Also, as disc section 20 requires a high degree of flatness; when a high pressure is kept applied with a poor degree of flatness of rotor yoke 4 that is to be bonded to disc section 20, disc section 20 is deformed in the shape of rotor yoke 4. By relieving or removing the pressure at this point, flatness of disc section 20 will not be directly deteriorated even when the flatness of the surface opposite to disc section 20 is poor, thus enabling disc section 20 to maintain a high degree of flatness after bonding. Also, as the amount of gases emitted from the adhesives is at its maximum immediately after the start of curing, by making the suction high at this point, effective gas absorption can be made. As it is possible to fully absorb emitted gases even by lowering the suction thereafter, the energy required for absorption at the factory can be saved.

FIG. 4A and FIG. 5A represent the process of exhausting gases emitted from adhesives during the process of fixing rotor yoke 4 made of a soft magnetic material and rotating magnet 5 magnetized to a plurality of poles to disc section 20 having a T-shaped cross section made by integrating into one piece spindle section 12a and disc-shaped recording medium section 2. FIG. 4B and FIG. 5B represent the process of exhausting gases emitted from adhesives during the process of fixing rotor yoke 4 and rotating magnet 5 magnetized into a plurality of poles to disc section 20 fabricated by integrating a spindle section, a hub, and rotor yoke 4 into one piece, and placing a disc-shaped information recording medium on the upper surface of the hub. However, assembling work can also be similarly carried out by using a disc section fabricated by press-fitting an annular information recording medium onto a projecting platform on the outer periphery of a hub press-fit in a spindle section, and securely bonding by an adhesive and the like (not shown).

Figure 6A:
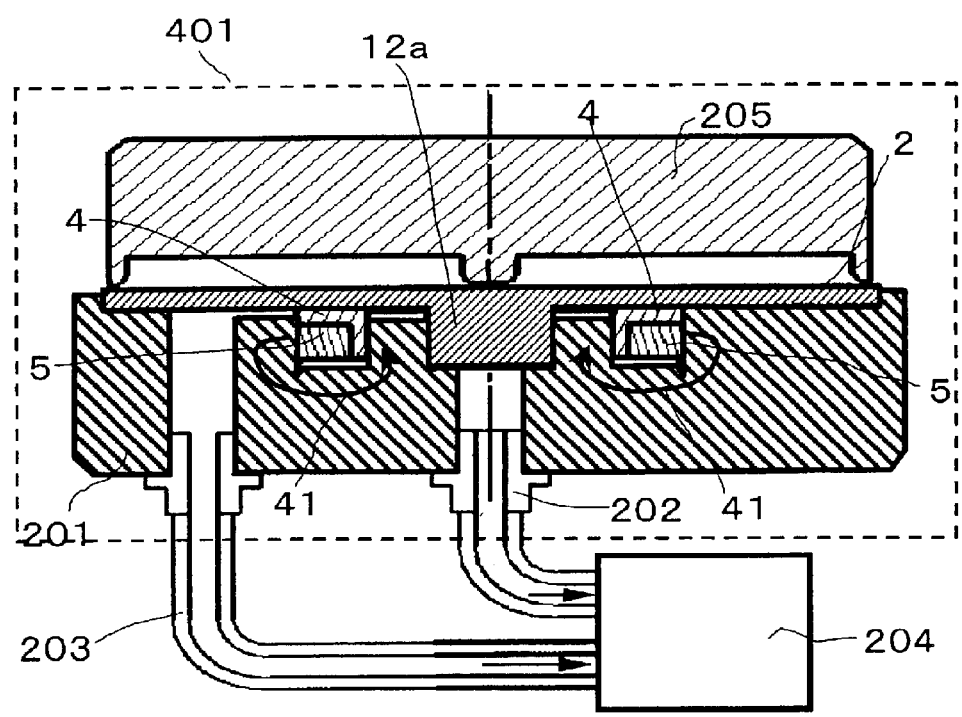
FIG. 6A is a diagram to illustrate yet another method of assembling a rotor structure in the first exemplary embodiment of the present invention.
Figure 6B:
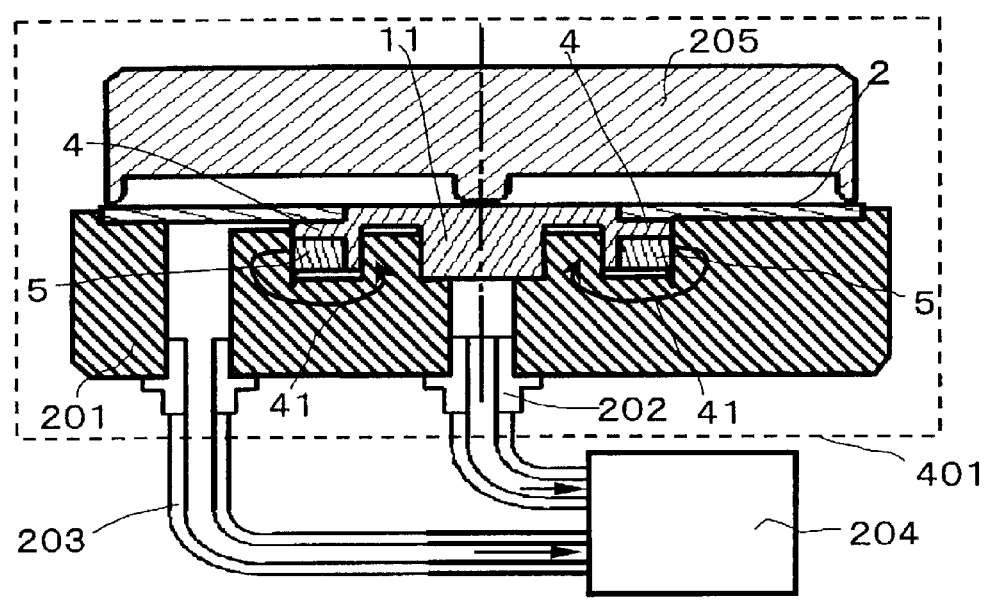
FIG. 6B is a diagram to illustrate yet another method of assembling yet another configuration of a rotor structure in the first exemplary embodiment of the present invention.

Although a description of the method of assembling a rotor structure, on which a disc-shaped medium is placed, for use in an information recording and playback apparatus in the first exemplary embodiment of the present invention was made with reference to an outer-rotor type rotor structure, it goes without saying that the same advantage is obtainable with an inner-rotor type rotor structure as shown in FIGS. 6A and 6B.

Also, in FIGS. 2, 4A, 4B, 5A, 5B, 6A, and 6B that illustrate the method of assembling a rotor structure in the first exemplary embodiment of the present invention, centering jig 201 that works as an emitted gas exhausting jig is constructed in a manner such that tubular holes are bored at two appropriate positions between the lower part of the central axis and the periphery of the center that go through from an exhaust inlet to an exhaust outlet in the bottom, exhaust pipe joint 202 is provided at the two outlet openings on the bottom surface of centering jig 201 for connecting exhaust pipes, and exhausting apparatus 204 such as an exhaust pump is connected to exhaust pipe joint 202 through exhaust pipe 203. However, the construction of centering jig 201 is not limited to this construction. While it is a requirement to make an exhaust inlet on the surface of centering jig 201 opposite to the bottom surface of the disc section, the position and number of boring exhaust inlets may be changed in so far as there is no inconvenience. For example, an exhaust outlet may be made on the side of centering jig 201. The number of the exhaust outlets may be one if the holes bored from the exhaust inlets provided on the surface opposite to the bottom surface of rotating disc of centering jig 201 are connected inside the jig. The shape of the holes may be an oval cylinder or a prism, and is not necessarily limited to a circular cylinder. The advantage of the centering jig does not change with such modifications. Furthermore, as centering jig 201 made of a soft magnetic material is used in these cases, too, leakage flux 41 converges, as a matter of course, in centering jig 201 made of a soft magnetic material and does not give an effect on the information recording layer formed with a magnetic substance of recording medium section 2. Here, depending on the configuration of rotor yoke 4, it is possible to make the leakage flux from rotating magnet 5 to the information recording layer of disc section 20 at a negligible level. In such a case, centering jig 20 may be made of a non-magnetic material.

Also, when the construction of disc section 20 is such that spindle section 12a and disc-shaped recording medium section 2 are integrated into one piece having a T-shaped cross section, or when a spindle section and a hub each made of a soft magnetic material are integrated into one piece and a disc-shaped information recording medium is placed and secured on the upper surface of the hub, centering work is carried out using outer circumference of the disc section as there is no circumference in the central portion that can be used for centering. In this case, it is necessary that the outer diameter of centering jig 201 made of a soft magnetic material be greater than the outer circumference of the disc section as shown in FIGS. 4A, 4B, 5A, 5B, and 6A. Also, when using a disc section fabricated by press-fitting or bonding with an adhesive an annular information recording medium on a projecting platform on the outer periphery of a hub made of a soft magnetic material and press-fit to a spindle, it is possible to carry out centering work by using outer circumference of the hub or inner circumference of the annular information recording medium.

Furthermore, in the above description, separate rotor yoke 4 and rotating magnet 5 were used in the step of assembling by bonding to the disc section rotor yoke 4 made of a soft magnetic material and rotating magnet 5 magnetized to a plurality of poles. However, a spindle motor of an information recording and playback apparatus may be completed by first fabricating a rotor unit by bonding in advance rotor yoke 4 and rotating magnet 5 with an adhesive and the like into one piece, assembling the rotor unit and the disc section without superimposing magnetic noise in the medium, and isolating emitted gases from and preventing them from reaching the information recording layer. Also, separately from the above-described another configuration in which a molded component made of a soft magnetic material and integrating hub 11 on which a medium is placed and rotor yoke 4 into one piece, by bonding rotating magnet 5 magnetized to a plurality of poles with a unit made in advance by bonding into one piece rotor yoke 4 made of a soft magnetic material to disc section 20, a spindle motor for an information recording and playback apparatus may be completed by assembling work using similar jig without superimposing magnetic noise in the medium and isolating emitted gases from the information recording layer and preventing them from reaching there.

As is described above, with the method of assembling a rotor structure in the first exemplary embodiment of the present invention, by carrying out exhaustion with an exhausting apparatus, such as a pump, when mounting a disc section on a centering jig, gases emitted from the adhesives are always isolated from the recording surface of the disc section and prevented from reaching there. This enables absorption of gases emitted when adhesives are cured and suppression of pollution of the recording surface of the disc section thus suppressing malfunctioning such as head crash due to pollution of the medium surface.

Also, as the centering jig employed in assembling a rotor structure in the first exemplary embodiment of the present invention uses a soft magnetic material, the leakage flux from rotating magnet 5 converges in centering jig 201 made of a soft magnetic material and does not reach the information recording layer (magnetic layer) formed with a magnetic substance of disc section 20. As a result, even when heat is applied, there is no effect of magnetic noise on the magnetic layer of disc section 20.

Second Exemplary Embodiment

Figure 7A:
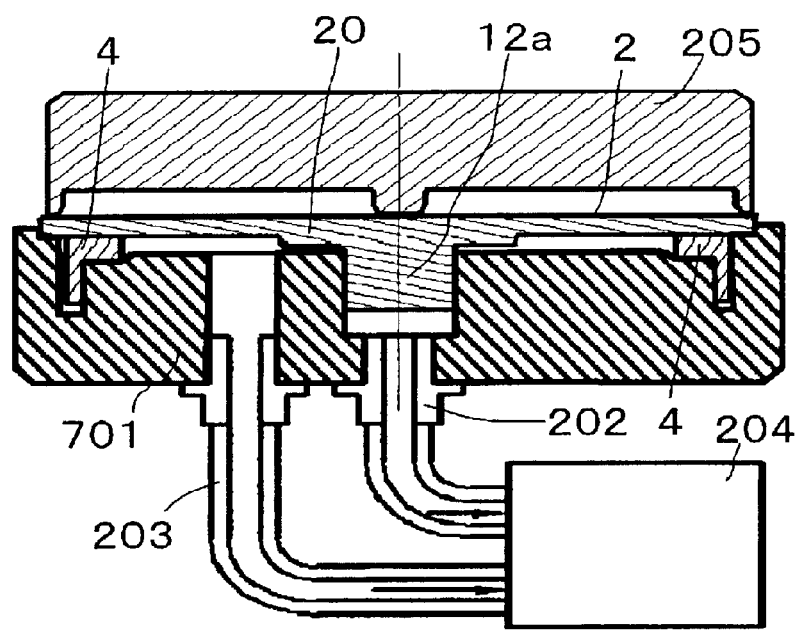
FIG. 7A is a diagram to illustrate a method of assembling a rotor structure in a second exemplary embodiment of the present invention.
Figure 7B:
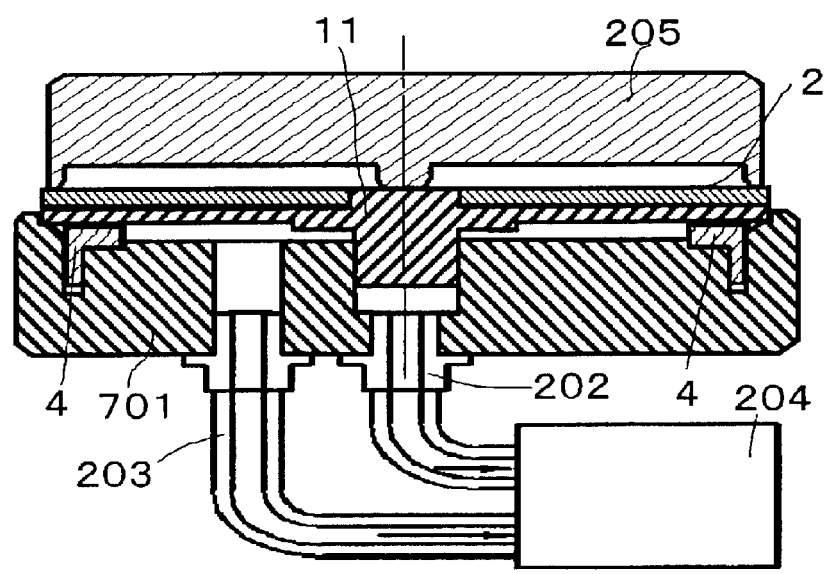
FIG. 7B is a diagram to illustrate a method of assembling another configuration of a rotor structure in the second exemplary embodiment of the present invention.

FIGS. 7A and 7B are schematic representations of the first half of the steps of assembling a rotor structure in a second exemplary embodiment of the present invention. According to the method of assembling a rotor structure in the second exemplary embodiment of the present invention, as part of the process of bonding a rotor yoke made of a soft magnetic material and a rotating magnet magnetized to a plurality of poles to a disc section having a T-shaped cross section fabricated by integrating into one piece a spindle section and a disc-shaped substrate section, or to a disc section fabricated by securing by press-fitting or with an adhesive an annular information recording medium on a projecting platform on the outer circumference of a hub press-fit in the spindle, a disc rotor unit is first assembled by securing the rotor yoke made of a soft magnetic material on the disc section, followed by securing on the disc rotor unit a rotating magnet magnetized to a plurality of poles. This method of assembling a rotor structure concerns technologies to suppress malfunctioning of information recording and playback apparatus due to adhesion on the surface of the recording medium of various gases or particulates emitted from the adhesives during the assembling work or to suppress performance reduction of the recording medium due to chemical reaction between various gases or particulates and the information recording layer of the recording medium. The scheme of isolating the gases emitted from adhesives from the information recording layer of the disc section and preventing them from reaching there is similar to that described in the first exemplary embodiment of the present invention.

In FIGS. 7A, 7B, similarly to the first exemplary embodiment of the present invention, medium assembling/centering jig 701 has a role of an emitted gas exhausting jig. An exhaust inlet is provided on a surface opposite to the bottom surface of a rotating disc, an exhaust outlet is provided on a surface where no exhaust inlet is provided, a communicating hole is bored between the exhaust inlet and the exhaust outlet, and exhaust pipe joint 202 is provided at the opening of the exhaust outlet. Exhausting apparatus 204 such as an exhaust pump is connected to exhaust pipe joint 202 via exhaust pipe 203. Here, the basic difference of the first half of the steps of assembling a rotor structure in the second exemplary embodiment from the first exemplary embodiment of the present invention is that the material of medium assembling/centering jig 701 is not limited to a soft magnetic material. In the first half of the steps of assembling a rotor structure in the second exemplary embodiment of the present invention, as a rotating magnet is not used in the step of bonding and assembling yoke section (rotor yoke) 4 on disc section 20, there is no necessity to consider the effect of leakage flux from the rotating magnet. Consequently, the material of assembling/centering jig 701 can be either a hard magnetic material or a non-magnetic material. The type of material does not matter.

Next, a description of the first half of the steps of assembling a rotor structure using these jigs in the second exemplary embodiment of the present invention will be given. First, rotor yoke 4 made of a soft magnetic material is disposed at a specified position on assembling/centering jig 701 after coating an adhesive on a specified surface of rotor yoke 4, and disc section 20 that integrates into one piece a spindle section and a disc-shaped substrate section and has a T-shaped cross section, or disc section 20 fabricated by securing by press-fitting or with an adhesive an annular medium on a projecting platform on the outer circumference of a hub that is press-fit in a spindle is placed at a specified position on assembling/centering jig 701. As components have been mounted on assembling/centering jig 701 ready for completion as a disc rotor unit, a weight made of a non-magnetic material is placed as pressing mechanism 205 on disc section 20. Subsequently, exhausting apparatus 204, such as a pump, is operated to exhaust gases and particulates emitted from adhesives via exhaust pipe joint 202 and exhaust pipe 203. Even in the event gases are emitted while bonding, as exhaustion is carried out with exhausting apparatus 204 such as a pump, emitted gases are isolated from the information recording layer of disc section 20 and will not reach there. FIGS. 7A, 7B illustrate the step of exhausting gases emitted from the adhesives when securing rotor yoke 4 made of a soft magnetic material to disc section 20 fabricated by assembling each component and curing the adhesive, integrating a spindle section and a disc-shaped substrate section into one piece having a T-shaped cross section, or to disc section 20 fabricated by securing by press-fitting or with an adhesive an annular information recording medium on a projecting platform on the outer circumference of a hub press-fit in a spindle. Also, although not shown in the diagrams, when a disc section fabricated by integrally forming a spindle and a hub, and securely placing a disc-shaped information recording medium on the upper surface of the hub is used, a disc rotor unit can be assembled through similar procedures.

Figure 8A:
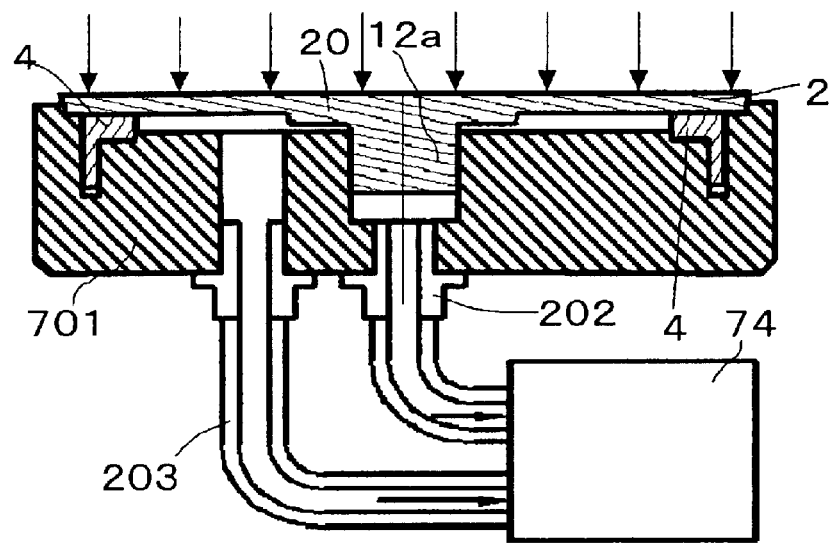
FIG. 8A is a diagram to illustrate another method of assembling a rotor structure in the second exemplary embodiment of the present invention.
Figure 8B:
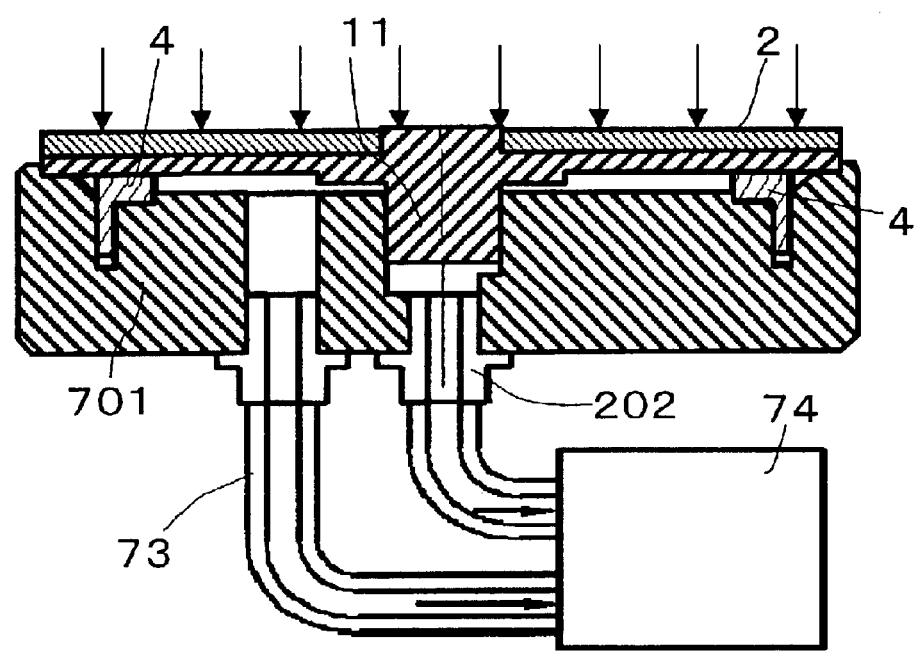
FIG. 8B is a diagram to illustrate another method of assembling another configuration of a rotor structure in the second exemplary embodiment of the present invention.

Also, by increasing the suction of exhausting apparatus 204 such as a pump, atmospheric pressure is exerted on the surface of disc section 20 as shown by downward arrows in FIGS. 8A and 8B without using a weight as pressing mechanism 205 for bonding. As a result, disc section 20 is sucked downward by assembling/centering jig 701, thus pressing disc section 20 and enabling prevention of pollution of the surface of disc section 20 without directly pressing by placing pressing mechanism 205 as a weight. In this case, by sending some air back through exhaust pipe 203 after assembling work is over, an added advantage of being able to take out a finished product with ease is obtained. In FIGS. 7A, 7B, 8A, and 8B that illustrate the first half of the steps of assembling a rotor structure in the second exemplary embodiment of the present invention, assembling/centering jig 701 has a construction, similar to centering jig 201 as described in the first exemplary embodiment, in which tubular holes are bored at two appropriate positions between the lower part of the central spindle section and the periphery of the center that go through from the exhaust inlet to the exhaust outlet, exhaust pipe joints 202 are provided at the two exhaust outlet openings on the bottom surface of assembling/centering jig 701 for connecting exhaust pipes 203, and exhausting apparatus 204 such as an exhaust pump is connected to exhaust pipe joints 202 through exhaust pipes 203. However, assembling/centering jig 701 is not limited to this construction. While it is a prerequisite to make an exhaust inlet on the surface of assembling/centering jig 701 opposite to the bottom surface of the rotating disc section, the position and number of boring exhibit inlet may be changed in so far as there is no inconvenience. For example, an exhaust outlet may be made on the side of assembling/centering jig 701. The number of the exhaust outlets may be one by connecting inside assembling/centering jig 701 holes bored from exhaust inlets provided on the surface opposite to the bottom surface of a rotating disc of assembling/centering jig 701. The shape of the holes may be an oval cylinder or a prism, and is not necessarily limited to cylinders. The advantages of medium assembling/centering jig 701 do not change with such modifications.

A description of the last half of the steps of assembling an information recording and playback apparatus in the second exemplary embodiment of the present invention will now be given, in which a rotating magnet magnetized to a plurality of poles is secured to a disc rotor unit after assembling a disc rotor unit by bonding rotor yoke 4 made of a soft magnetic material and disc section 20. As the last half of the steps uses centering jig 201 made of a soft magnetic material as used in the first exemplary embodiment and many of the steps and the operation of the first exemplary embodiment are common, FIGS. 4A and 4B that are used in the assembling method of the first exemplary embodiment will be used as is. As many of the steps including the construction of centering jig 201 made of a soft magnetic material are the same as in the description of the first exemplary embodiment, duplicate description will be omitted.

In FIGS. 4A and 4B, a thermosetting adhesive is coated on a specified bonding surface of rotating magnet 5, and rotating magnet 5 is disposed at a specified position on centering jig 201 made of a soft magnetic material. Subsequently, disc section 20 fabricated by bonding a disc rotor unit by coating a thermosetting adhesive on a specified bonding surface of rotor yoke 4 made of a soft magnetic material of an assembled disc rotor unit is placed at a specified position of centering jig 201 made of a soft magnetic material. With this, as each of the components has been mounted on centering jig 201 made of a soft magnetic material ready for completion of assembling, a weight made of a non-magnetic material is placed for the second time on disc section 20 as pressing mechanism 205 for securing. Lastly, gases and particulates emitted from the adhesive are exhausted by operating exhausting apparatus 204 such as a pump. In the event gases are emitted when bonding, the emitted gases are isolated from the information recording layer of disc section 20 and will not reach there as exhaustion is being carried out with exhausting apparatus 204 such as a pump.

Also, as shown in FIGS. 5A and 5B in the description of the first exemplary embodiment, by increasing the suction of exhausting apparatus 204 such as a pump, it is possible in the second exemplary embodiment, too, to bond and assemble while preventing pollution of the surface of the disc section due to a contact by not using pressing mechanism 205 for bonding.

Also, it is preferable to use a soft magnetic material for centering jig 201 to be used in the last half of the steps of assembling a rotor structure in the second exemplary embodiment of the present invention. Similar to what was described in the method of assembling a rotor structure in the first exemplary embodiment of the present invention, this is because leakage flux from rotating magnet 5 converges in centering jig 201 made of a soft magnetic material and does not reach the recording layer of the disc section formed with a magnetic substance, and an effect of magnetic noise on the magnetic layer of the disc section is suppressed even when heat is applied.

As is described above, in the method of assembling a rotor structure in the second exemplary embodiment, too, as in the first exemplary embodiment, when mounting disc section 20 on assembling/centering jig 701 or centering jig 201, gases emitted from adhesives are always isolated and prevented from reaching the information recording layer of disc section 20 by carrying out exhaustion with exhausting apparatus 204 such as a pump. This enables ejection of outgases generated when adhesives are cured and suppression of pollution of the information recording layer of disc section 20 and thus suppression of malfunctioning such as head crash caused by degradation and deterioration due to pollution.

While the method of assembling a rotor structure in the second exemplary embodiment of the present invention has been described on an outer-rotor type structure, similar advantage is obtainable with an inner-rotor type structure as a matter of course.

Figure 9:
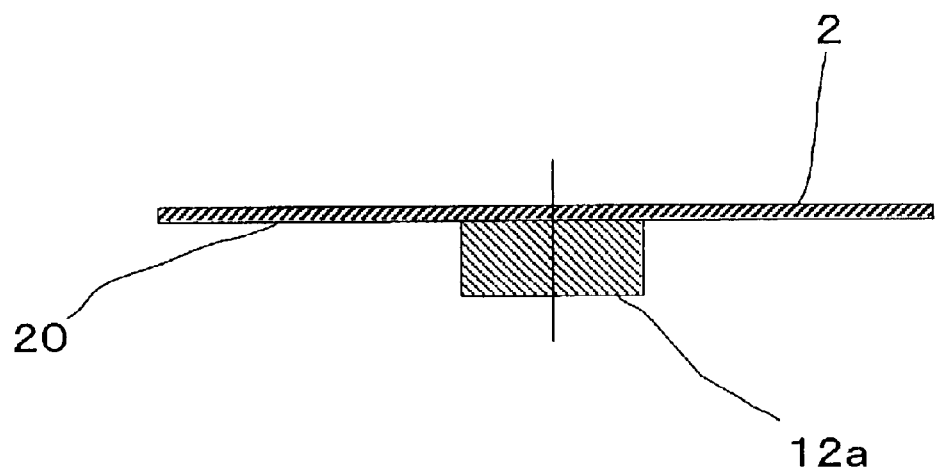
FIG. 9 is a diagram to illustrate the form of a rotor structure of another configuration in the first and second exemplary embodiments of the present invention.

Also, although a description of the method of assembling a rotor structure in the first and second exemplary embodiments was given on a case where spindle section 12a has been bonded to disc section 20 in advance, the method is applicable as a matter of course to the case of securing spindle section 12a to flat plate disc section 20 with an adhesive as shown in FIG. 9.

As has been described above, the present invention provides, in a manufacturing operation of a rotor structure on which a disc-shaped information recording medium for an information recording and playback apparatus for recording and playing back information using magnetism is placed, a method of assembling a rotor structure having a superior advantage of being able to isolate from the information recording layer gases and particulates emitted from adhesives in the components assembling process, and to prevent them from adhering to or reacting with the information recording layer.

What is claimed is:

1. A method of assembling a rotor structure for use in an information and playback apparatus comprising a disc section having an information recording layer on a main surface and a cylindrical projecting member, said method comprising the steps of:
   a) placing said projecting member and said disc section at predetermined positions on a centering jig;
   b) integrating said disc section and said projecting member into one piece by pressing said disc section and said projecting member; and
   c) exhausting gases emitted during step b) wherein the direction of flow of the exhausted gases is from the main surface of said disc section toward said projecting member;
   wherein the assembling/centering jig or the centering jig has an exhaust inlet provided on a surface opposite to a bottom surface of the disc section, an exhaust outlet provided on a surface not provided with said exhaust inlet, and a communicating hole bored between said exhaust inlet and said exhaust outlet thus enabling exhaustion of emitted gases by connecting an exhausting apparatus to said exhaust outlet via an exhaust pipe.

2. A method of assembling a rotor structure for use in an information and playback apparatus comprising a yoke section, a rotating magnet, and a disc section having an information recording layer on a main surface, said method comprising the steps of:
   a) placing said yoke section, said disc section and said rotating magnet at predetermined positions on a centering jig;
   b) integrating said disc section, said yoke section, and said rotating magnet into one piece by pressing said disc section, said yoke section, and said rotating magnet; and
   c) exhausting gases emitted during step b) wherein the direction of flow of the exhausted gases is from the main surface of said disc section toward said yoke section;
   wherein the step of integration is carried out while heating and using a centering jig made of a soft magnetic material, and
   wherein the assembling/centering jig or the centering jig has an exhaust inlet provided on a surface opposite to a bottom surface of the disc section, an exhaust outlet provided on a surface not provided with said exhaust inlet, and a communicating hole bored between said exhaust inlet and said exhaust outlet thus enabling exhaustion of emitted gases by connecting an exhausting apparatus to said exhaust outlet via an exhaust pipe.

3. A method of assembling a rotor structure for use in an information and playback apparatus comprising a yoke section, a rotating magnet, and a disc section having an information recording layer on a main surface, said method comprising the steps of:
   a) placing said yoke section, said disc section and said rotating magnet at predetermined positions on a centering jig;
   b) integrating said disc section, said yoke section, and said rotating magnet into one piece by pressing said disc section, said yoke section, and said rotating magnet; and
   c) exhausting oases emitted during step b) wherein the direction of flow of the exhausted gases is from the main surface of said disc section toward said yoke section;
   a method of assembling a rotor structure for use in an information and playback apparatus comprising a yoke section and a disc section having an information recording layer on a main surface, said method comprising the steps of:
   a) placing said yoke section and said disc section at predetermined positions on a centering jig;
   b) integrating said disc section and said yoke section into one piece by pressing said disc section and said yoke section; and
   c) exhausting gases emitted during step b wherein the direction of flow of the exhausted gases is from the main surface of said disc section toward said yoke section;
   wherein the step of integration is carried out by using a thermosetting adhesive or by using, while heating, an adhesive curing of which is promoted by heating, as well as by using a centering jig made of a soft magnetic material; and
   wherein the assembling/centering jig or the centering jig has an exhaust inlet provided on a surface opposite to a bottom surface of the disc section, an exhaust outlet provided on a surface not provided with said exhaust inlet, and a communicating hole bored between said exhaust inlet and said exhaust outlet thus enabling exhaustion of emitted gases by connecting an exhausting apparatus to said exhaust outlet via an exhaust pipe.

4. A method of assembling a rotor structure for use in an information and playback apparatus comprising a yoke section and a disc section having an information recording layer on a main surface, said method comprising the steps of:
   a) placing said yoke section and said disc section at predetermined positions on a centering jig;
   b) integrating said disc section and said yoke section into one piece by pressing said disc section and said yoke section; and
   c) exhausting gases emitted during step b wherein the direction of flow of the exhausted gases is from the main surface of said disc section toward said yoke section;
   wherein the step of integration is carried out by using a thermosetting adhesive or by using, while heating, an adhesive curing of which is promoted by heating, as well as by using a centering jig made of a soft magnetic material; and
   wherein the assembling/centering jig or the centering jig has an exhaust inlet provided on a surface opposite to a bottom surface of the disc section, an exhaust outlet provided on a surface not provided with said exhaust inlet, and a communicating hole bored between said exhaust inlet and said exhaust outlet thus enabling exhaustion of emitted gases by connecting an exhausting apparatus to said exhaust outlet via an exhaust pipe.

5. A method of assembling a rotor structure for use in an information and playback apparatus comprising a yoke section, a rotating magnet, and a disc section having an information recording layer on a main surface, said method comprising the steps of:
   a) placing said yoke section, said disc section and said rotating magnet at predetermined positions on a centering jig;
   b) integrating said disc section, said yoke section, and said rotating magnet into one piece by pressing said disc section, said yoke section, and said rotating magnet; and c) exhausting gases emitted during step b) wherein the direction of flow of the exhausted gases is from the main surface of said disc section toward said yoke section;

wherein the assembling/centering jig or the centering jig has an exhaust inlet provided on a surface opposite to a bottom surface of the disc section, an exhaust outlet provided on a surface not provided with said exhaust inlet, and a communicating hole bored between said exhaust inlet and said exhaust outlet thus enabling exhaustion of emitted gases by connecting an exhausting apparatus to said exhaust outlet via an exhaust pipe.

6. A method of assembling a rotor structure comprising a yoke section, a rotating magnet, and a disc section having an information recording layer on a main surface, said method comprising the steps of:

a) placing said rotating magnet and said disc section on which said yoke section has been formed at predetermined positions on a centering jig;

b) integrating said disc section and said rotating magnet into one piece by pressing said disc section and said rotating magnet; and c) exhausting gases emitted during step b) wherein the direction of flow of the exhausted gases is from the main surface of said disc section toward said yoke section;

wherein the assembling/centering jig or the centering jig has an exhaust inlet provided on a surface opposite to a bottom surface of the disc section, an exhaust outlet provided on a surface not provided with said exhaust inlet, and a communicating hole bored between said exhaust inlet and said exhaust outlet thus enabling exhaustion of emitted gases by connecting an exhausting apparatus to said exhaust outlet via an exhaust pipe.

* * * * *

UNITED STATES PATENT AND TRADEMARK OFFICE
CERTIFICATE OF CORRECTION

PATENT NO. : 6,915,557 B2
APPLICATION NO. : 10/224721
DATED : July 12, 2005
INVENTOR(S) : Shigeo Obata It is certified that error appears in the above-identified patent and that said Letters Patent is hereby corrected as shown below:

<u>Column 15</u>
Line 64, change "oases" to --gases--

<u>Column 16</u>
Lines 1-14, delete as follows
"a method of assembling a rotor structure for use in an information and playback apparatus comprising a yoke section and a disc section having an information recording layer on a main surface, said method comprising the steps of:
    a)     placing said yoke section and said disc section at predetermined positions on a centering jig;
    b)     integrating said disc section and said yoke section into one piece by pressing said disc section and said yoke section; and
    c)     exhausting gases emitted during step b wherein the direction of flow of the exhausted gases is from the main surface of said disc section toward said yoke section;"

Signed and Sealed this

Fifteenth Day of August, 2006

JON W. DUDAS
*Director of the United States Patent and Trademark Office*